United States Patent [19]

Blick

[11] 3,880,145
[45] Apr. 29, 1975

[54] METHOD AND APPARATUS FOR CONTINUOUSLY MONITORING BLOOD PRESSURE

[75] Inventor: Edward F. Blick, Norman, Okla.

[73] Assignee: Paul D. Stein, Oklahoma City, Okla.; a part interest

[22] Filed: Oct. 2, 1972

[21] Appl. No.: 293,991

[52] U.S. Cl. .................. 128/2.05 A; 128/2.05 E
[51] Int. Cl. .............................................. A61b 5/02
[58] Field of Search...... 128/2.05 E, 2.05 N, 2.05 P, 128/2.05 R, 2.05 S, 2.05 T, 2.05 V, 2.06 E, 2.06 R, 2 R, 2 T; 73/419, 420, 408

[56] References Cited
UNITED STATES PATENTS

| | | | |
|---|---|---|---|
| 2,555,422 | 6/1951 | Scott et al. | 128/2.05 P |
| 2,769,929 | 11/1956 | Hardway, Jr. | 128/2.05 P |
| 3,154,067 | 10/1964 | Stenstrom et al. | 128/2.05 P |
| 3,187,098 | 6/1965 | Farrar | 128/2.05 P |
| 3,724,274 | 4/1973 | Millar | 128/2.05 D |

FOREIGN PATENTS OR APPLICATIONS

| | | | |
|---|---|---|---|
| 1,258,016 | 1/1968 | Germany | 128/2.05 E |

Primary Examiner—William E. Kamm
Attorney, Agent, or Firm—Laney, Dougherty, Hessin & Fish

[57] ABSTRACT

An electro-mechanical force sensing transducer for use with suitable receiving and recording means for measuring intra-arterial blood pressure which includes a housing having a bore formed therethrough with a force sensing head disposed in the lower portion of the bore for engaging the surface of the skin over a superficial artery to sense blood pressure variations. A positioning member is threadedly secured in the upper portion of the bore and a compression spring is disposed between the positioning member and the force sensing head for urging the force sensing head into contact with the surface of the skin. The force sensing head includes a conventional strain gage enclosed therein with electrical conduit means extending therefrom for connection to the receiving and recording means. Another aspect of the present invention is a transducer assembly including the force sensing transducer carried in a supporting frame and attachable to a patient by means of a strap secured to the supporting frame. In another form the transducer assembly includes two force sensing transducers. In still another form the force sensing transducer assembly includes three force sensing transducers. In yet another form the transducer assembly includes four force sensing transducers. Also disclosed are methods for continuously monitoring blood pressure utilizing the transducer assemblies disclosed.

3 Claims, 17 Drawing Figures

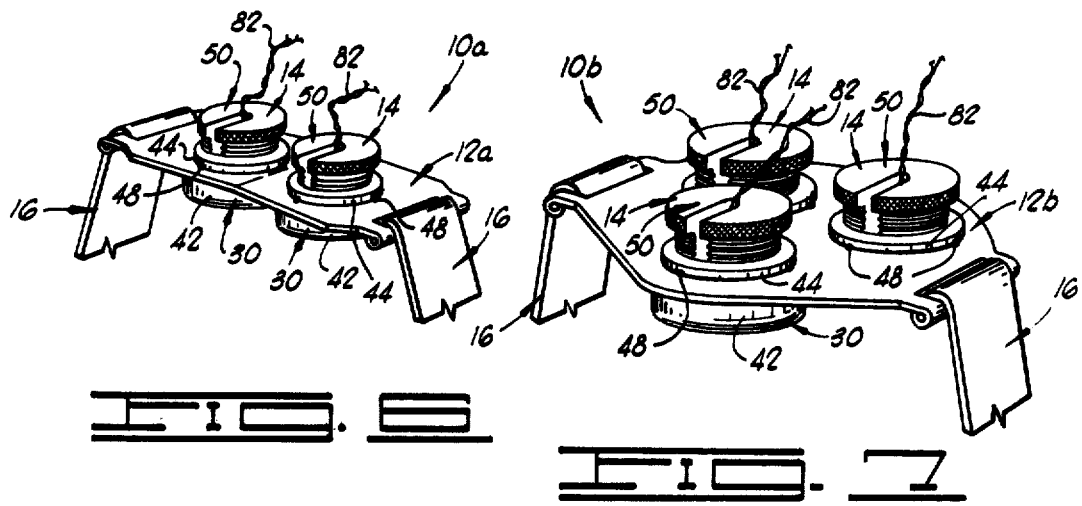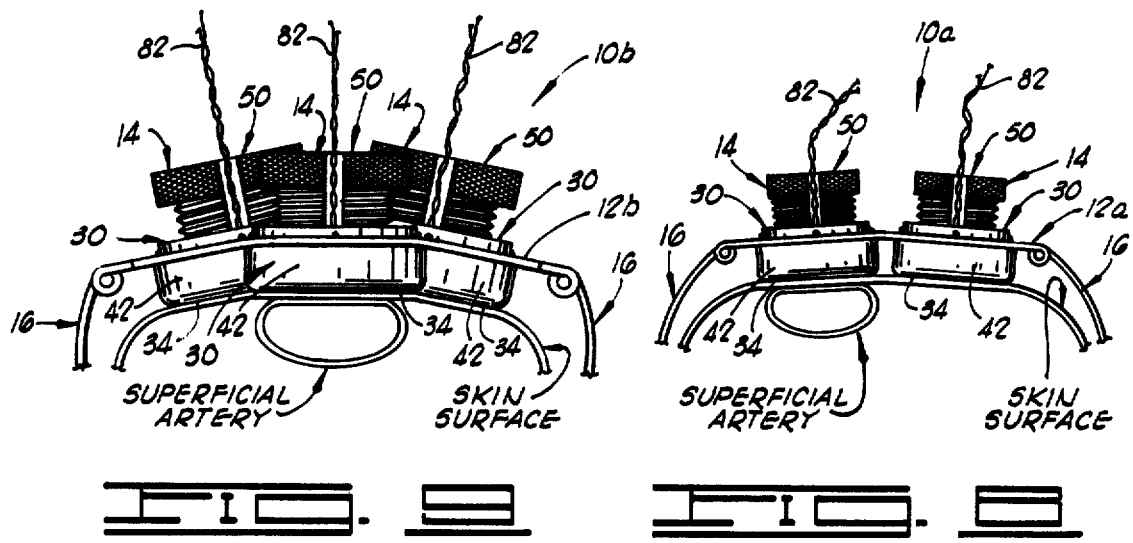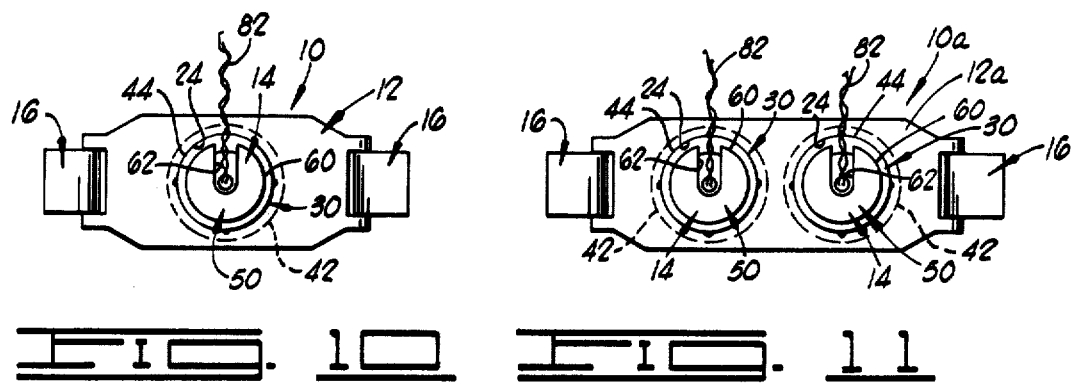

METHOD AND APPARATUS FOR CONTINUOUSLY MONITORING BLOOD PRESSURE

BACKGROUND OF THE INVENTION

1. Field of the Invention

This invention relates generally to improvements in method and apparatus for measuring intra-arterial blood pressure, and more particularly, but not by way of limitation, to an arterial tonometric device for the non-invasive, continuous, and instantaneous measurement of blood pressure.

2. Description of the Prior Art

Arterial tonometry is a technique for the measurement of arterial blood pressure by means of a force sensing device positioned over a superficial artery. Tonometry is utilized routinely for a clinical measurement of intra-ocular pressure. In an analagous fashion, the method can be applied to the measurement of intra-arterial pressure.

Most efforts in recent years to develop non-invasive methods for the measurement of arterial blood pressure have been upon adaptations of the sphygmomanometric technique. Little attention has been given to the tonometric technique, although this technique is most direct.

Known methods of applying the tonometric technique have been accompanied by difficulties in correlating blood pressure indications obtained by the tonometric devices with the blood pressure readings obtained through the use of a conventional sphygmomanometer. Such difficulties have been occasioned by the inherent limitations of the prior art tonometric devices when attempting to calibrate them. Also, the positioning of the tonometric transducer device on the patient has been shown to be a critical factor in obtaining readings reasonably corresponding to calibration standards. The prior art tonometric transducer devices have shown themselves to be subject to unacceptable blood pressure indication variations due to slight movement of the transducer devices from the initial positioning on the patient, and resultant calibration disruption caused by such movement.

SUMMARY OF THE INVENTION

The present invention contemplates a novel transducer for use with suitable receiving means for measuring arterial blood pressure. The transducer includes a housing having an upper end face, a lower end face, and a bore extending therethrough and intersecting the upper and lower end faces. A force sensing head is disposed within the bore of the housing and includes a planar surface formed on the lower end portion thereof and an upper end face, with the force sensing head carrying a conventional strain gage therein responsive to the deflection of the planar surface, and with the planar surface lying in a plane substantially parallel to the lower end face of the housing. Positioning means is disposed in the bore of the housing for positioning the force sensing head within the bore of the housing. Biasing means is carried in the bore intermediate the force sensing head and the positioning means for urging the force sensing head away from the positioning means. Electrical conduit means is connected to the strain gage of the force sensing head for electrically connecting the force sensing head to the receiving means.

An object of the present invention is to provide a tonometric transducer for use with a suitable receiving means which can measure continuously and instantaneously any variations of systolic or diastolic blood pressure in a non-invasive fashion.

Another object of the present invention is to provide a tonometric transducer assembly for use in measuring the arterial blood pressure of a patient which may be simply and accurately calibrated.

Still another object of the present invention is to provide improved methods of employing tonometric transducer assemblies to measure continuously and instantaneously any variations of systolic or diastolic blood pressure.

A further object of the present invention is to provide a tonometric transducer assembly for use in measuring the arterial blood pressure of a patient which will automatically correct for variations in blood pressure readings occasioned by small movements of the transducer assembly relative to the skin's surface or the superficial artery being monitored.

A still further object of the present invention is to provide a tonometric transducer assembly for use in measuring the arterial blood pressure of a patient which may be simply and easily secured to the patient and accurately calibrated while in place thereon.

Yet another object of the present invention is to provide a tonometric transducer assembly for use in measuring the arterial blood pressure of a patient which is economical to construct and maintain, and simple and convenient to operate.

Further objects and advantages of the present invention will be evident from the following detailed description when read in conjunction with the accompanying drawings.

BRIEF DESCRIPTION OF THE DRAWINGS

FIG. 6 is a perspective view of another form of transducer assembly comprising two transducers.

FIG. 7 is a perspective view of an alternate form of transducer assembly comprising three transducers.

FIG. 8 is a side elevation view of the transducer assembly of FIG. 6 illustrating the positioning thereof in relation to the superficial artery of a patient.

FIG. 9 is a side elevation view of the transducer assembly of FIG. 7 illustrating the positioning thereof in relation to the superficial artery of a patient.

FIG. 10 is a top view of the transducer assembly of FIG. 1.

FIG. 11 is a top view of the transducer assembly of FIG. 6.

DESCRIPTION OF THE PREFERRED EMBODIMENT

Figure 1:
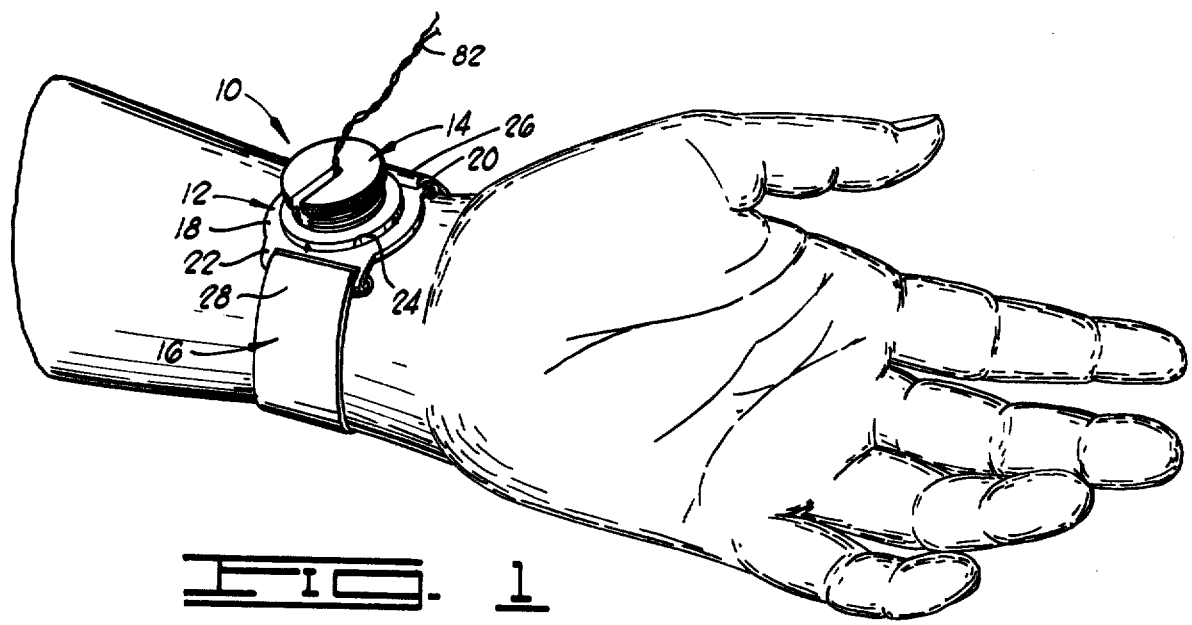
FIG. 1 is a pictorial view illustrating a transducer assembly of the present invention attached to the arm of a patient.
Figure 2:
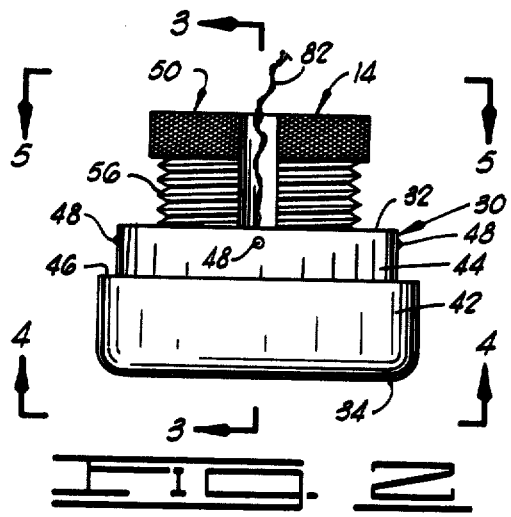
FIG. 2 is an elevation view of the transducer of the present invention.
Figure 3:
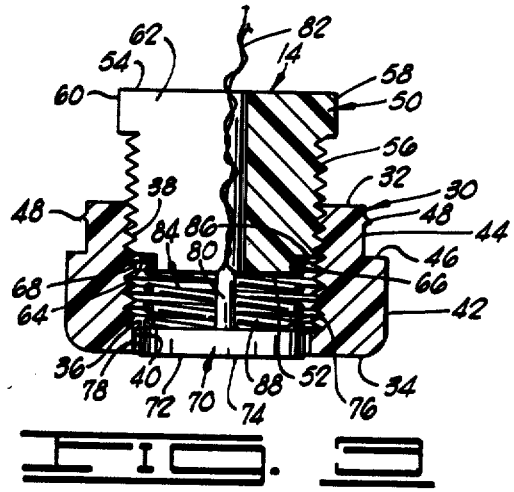
FIG. 3 is a cross-sectional view of the transducer of the present invention taken along line 3—3 of FIG. 2.
Figure 4:
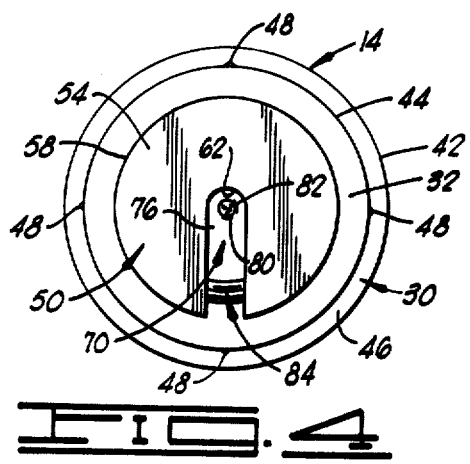
FIG. 4 is a bottom view of the transducer of the present invention taken along line 4—4 of FIG. 2.
Figure 5:
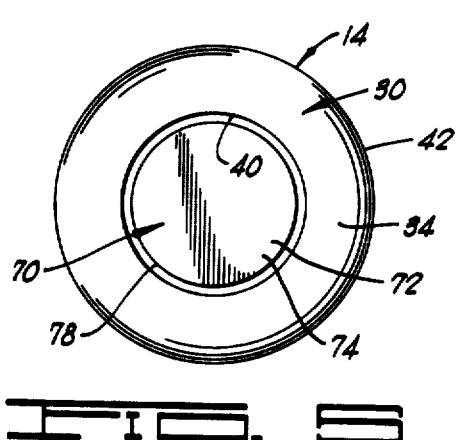
FIG. 5 is a top view of the transducer of the present invention taken along line 5—5 of FIG. 2.

Referring now to the drawings, and more particularly, to FIGS. 1–5 and FIG. 10, the apparatus of the present invention will be hereinafter referred to as a transducer assembly and will be generally designated by the reference character 10.

The transducer assembly 10 comprises a transducer supporting frame 12, an electro-mechanical force sensing transducer 14, and a strap or the like 16. The transducer supporting frame 12 includes a substantially flat plate 18 having opposite end portions 20 and 22. The plate 18 includes a substantially circular aperture 24 formed in the medial portion thereof intermediate the end portions 20 and 22.

The strap 16 is secured at the opposite end portions 26 and 28 thereof to the respective end portions 20 and 22 of the transducer supporting frame 12. The strap 16 may be separated at the medial portion thereof and provided with suitable interconnecting means to facilitate the application of the transducer assembly 10 to a patient (not shown). Such suitable means of connection may be the conventional Velcro hook and loop apparatus. The strap 16 may be suitably constructed of elastic material to constantly bias the transducer assembly 10 into contact with the outer surface of the skin of a patient.

The flat plate 18 of the trasducer supporting frame 12 may be suitably formed of such synthetic resin materials as Nylon or Delrin or formed of metallic material. A preferable metallic material for use in constructing the transducer supporting frame 12 would be stainless steel sheet ranging in thickness from approximately one thirty-second to one-sixteenth inch. The plate 18 may be readily manipulated or bent to conform to the skin surface contour of the patient to whom the transducer assembly 10 will be applied.

The force sensing transducer 14 includes a housing 30. The housing 30 includes an upper end face 32 and a lower end face 34 with a bore 36 extending therethrough intersecting the upper and lower end faces 32 and 34. The bore 36 includes an internally threaded portion 38 coaxially aligned with the bore 36 and intersecting the upper end face 32 of the housing 30 and extending downwardly therefrom. The bore 36 also includes a substantially cylindrically shaped inner periphery 40 formed therein and coaxially aligned therewith, and intersecting the lower end face 34 of the housing 30 and extending upwardly therefrom. The cylindrically shaped inner periphery 40 and the internally threaded portion 38 intersect intermediate the upper and lower end faces 32 and 34 of the housing 30.

A first cylindrical surface 42 is formed on the outer periphery of the housing 30 intersecting the lower end face 34 thereof and extending upwardly therefrom. The first cylindrical surface 42 is substantially coaxial with the bore 36. The intersection of the surface 42 and the lower end face 34 is preferably smoothly rounded to afford maximum comfort to the patient. A second cylindrical surface 44, having a diameter less than the first cylindrical surface 42, is formed on the outer periphery of the housing 30, intersecting the upper end face 32 thereof and extending downwardly therefrom. A circumferential wall 46 extends radially outwardly from the second cylindrical surface 44 and intersects the first cylindrical surface 42. The outer diameter of the second cylindrical surface 44 is slightly less than the diameter of the aperture 24 formed in the transducer supporting frame 12. The outer diameter of the first cylindrical surface 42 is substantially greater than the diameter of the aperture 24 of the transducer supporting frame 12. A plurality of protuberances 48 are disposed about second cylindrical surface 44 in spaced relation and extending radially outwardly therefrom. The protuberances 48 are spaced upwardly from the circumferential wall 46 a distance slightly greater than the thickness of the flat plate 18 of the transducer supporting frame 12 for purposes which will be described in greater detail hereinafter.

A positioning member 50 having a lower end face 52 and an upper end face 54 is disposed within the bore 36 of the housing 30. The lower portion of the positioning member 50 includes an externally threaded portion 56 which extends upwardly from the intersection thereof with the lower end face 52 and is threadably engaged with the internally threaded portion 38 of the bore 36. A cylindrical surface 58, coaxially aligned with the externally threaded portion 56, is formed on the upper end portion 60 of the positioning member 50, intersecting the upper end face 54 and extending downwardly therefrom. The cylindrical surface 58 and the externally threaded portion 56 intersect intermediate the lower and upper end faces 52 and 54. The diameter of the cylindrical surface 58 is preferably slightly greater than the maximum outer diameter of the externally threaded portion 56 and is less than the diameter of the second cylindrical surface 44 of the housing 30. The cylindrical surface 58 is preferably knurled or grooved to provide a non-slip surface for gripping with the fingertips.

A longitudinal groove 62 is formed in the positioning member 50 and intersects the lower and upper end faces 52 and 54 thereof. The longitudinal groove 62 is substantially aligned with the axes of the externally threaded portion 56 and the cylindrical surface 58 of the positioning member 50. The longitudinal groove 62 intersects the externally threaded portion 56 and the cylindrical surface 58 of the positioning member 50.

The lower end face 52 of the positioning member 50 preferably includes an annular recess 64 formed therein. The annular recess 64 includes a cylindrical surface 66 and a radial wall 68 extending outwardly therefrom.

A force sensing head 70 is disposed within the lower portion of the bore 36 in the housing 30. The force sensing head 70 includes a lower end portion 72 upon which is formed a downwardly facing planar surface 74. An upper end face 76 is also formed on the force sensing head 70. A substantially cylindrically shaped outer periphery 78 extends between the planar surface 74 and the upper end face 76 and is in substantial axial alignment with the bore 36 in the housing 30. The diameter of the outer periphery 78 is preferably slightly less than the diameter of the inner periphery 40 of the bore 36. The planar surface 74 and the upper end face 76 each lie in planes substantially normal to the axis of the outer periphery 78 and, therefore, substantially normal to the axis of the bore 36. A cylindrically shaped extension or protuberance 80 extends upwardly from the upper end face 76 of the force sensing head 70.

The force sensing head 70 includes a conventional strain gage (not shown) enclosed within its walls. The strain gage is disposed within the force sensing head 70 such that it is responsive to the deflection of the planar surface 74 for purposes which will be described more fully hereinafter. Electrical conduit means 82 extends from the strain gage upwardly through the extension 80 and is routed therefrom through the longitudinal groove 62 of the positioning member 50 for connection to a suitable receiver at a point remote from the transducer assembly 10. The electrical conduit means 82 may be suitably constructed of two-stranded insulated copper wire.

A suitable force sensing head 70 is manufactured by Konigsberg Instrument Co., Inc., Pasadena, Calif. A suitable force sensing head 70 is found to have a diameter of approximately 2 to 6 millimeters for the cylindrically shaped outer periphery 78, and an axial dimension of approximately 1 millimeter between the planar surface 74 and the upper end face 76.

A compression coil spring 84 is disposed within the bore 36 of the housing 30 intermediate the lower end face 52 of the positioning member 50 and the upper end face 76 of the force sensing head 70. The upper end portion 86 of the spring 84 is preferably received in the annular recess 64 formed in the lower end face 52 of the positioning member 50, while the lower end portion 88 of the spring 84 engages the upper end face 76 of the force sensing head 70. The compression spring 84 downwardly biases the force sensing head 70 relative to the positioning member 50 and the housing 30. It will be readily apparent that the magnitude of this downward biasing may be varied by adjustment of the axial positioning of the positioning member 50 relative to the housing 30 by turning the positioning member 50 relative to the housing 30 with the resulting axial movement through the threaded engagement of these two elements.

It will be understood that in operation the planar surface 74 of the force sensing head 70 and the lower end face 34 of the housing 30 will engage the surface of the skin of a patient and will, therefore, lie in substantially the same plane. It will also be readily apparent that due to the size relationship between the diameter of the inner periphery 40 of the bore 36 in the housing 30 and the outer periphery 78 of the force sensing head 70, the force sensing head 70 will be free to move axially within the relative to the housing 30 when in engagement with the skin of a patient.

The force sensing transducer 14 is mounted in the transducer supporting frame 12 in the following manner. The second cylindrical surface 44 of the housing 30 is inserted upwardly through the aperture 24 formed in the flat plate 18 of the transducer supporting frame 12. The housing 30 and the transducer supporting frame 12 are compressed together until the protuberances 48 formed on the cylindrical surface 44 are forced entirely through the aperture 24. The housing 30 is preferably formed of a synthetic resin material such as Nylon or Delrin which is somewhat resilient in nature. This material allows the protuberannces 48 to be momentarily deflected as they pass through the aperture 24 after which the protuberances 48 resume their original shape thereby retaining the housing 30 in the aperture 24 of the transducer supporting frame 12.

The force sensing head 70, spring 84, and positioning member 50 are then inserted downwardly into the bore 36 in the housing 30 in the relative positions decribed above. The positioning member 50 is threadedly engaged in the bore 36 by means of the threaded portions 56 and 38 formed respectively thereon. This mode of assembly is facilitated by the diameter relationships specifically described above. This feature permits the interchange of force sensing heads 70 in the transducer supporting frame 12 without removing the transducer assembly 10 from a patient. An additional advantage is that the signals from the force sensing head 70 can be readily calibrated with the force sensing head lifted from contact with the skin surface without requiring the removal of the remainder of the force sensing transducer 10 from the patient.

OPERATION OF THE PREFERRED EMBODIMENT

In order to operate the transducer assembly 10, a readily palpable artery in an area that can be comfortably immobilized is required. The artery must be superficial, that is near the surface of the skin, to eliminate as much as possible the effects of subcutaneous tissue upon readings and recordings. The artery should also be firmly supported by an underlying structure, such as bone, to permit the ready application of the transducer assembly 10. For these reasons, a radial artery or *dorsalis pedis* has been found to be a most convenient artery from which to obtain readings.

The transducer assembly 10 is then applied to the patient with the planar surface 74 of the force sensing head 70 positioned directly over the selected superficial artery. The transducer assembly 10 is secured in proper position under the proper amount of pressure by means of the strap 16. The electrical conduit 82 is then electrically connected to a suitable receiving and recording instrument. The receiving and recording instrument applies an electrial voltage differential across the strain gage carried in the force sensing head 70 and senses and records variations in this voltage differential occasioned by the deflection or distortion of the strain gage as a result of variations is the radius of the superficial artery acting through the planar surface 74 of the force sensing head 70.

Calibration of such tonometrically recorded intraarterial blood pressure is accomplished by comparing it with a simultaneously measured standard. For example, tonometrically measured pressure can readily be calibrated with a single pressure measured with a conventional sphygmomanometer. A zero base line is recorded by lifting the force sensing head 70 from the surface of the skin. Peak deflection during control measurements is defined as being equal to peak systolic pressure measured by the sphygmomanometer. Changes in blood pressure produced by an intervention, such as a physiological status change, are proportional to changes in the magnitude of deflection or recorded reading. Diastolic pressure can be calibrated separately and calculated in an identical fashion on the basis of comparison with a control measurement. An abrupt or unexplained apparent pressure change of tonometrically recorded intra-arterial blood pressure is suggestive of displacement of the transducer relative to the artery over which it has been placed. When this occurs, recalibration is necessary.

Several important practical considerations are necessary for the operation of the transducer assembly 10. As noted above, the force sensing head 70 must be placed directly over the superficial artery. Skin and the thin layer of subcutaneous tissue between the artery and the transducer assembly 10 must be compressed as much as possible. The transducer assembly 10 and force sensing head 70 must be positioned in such a way that the vessel is not occluded, yet the transducer must be placed firmly over the pulsating artery. It has been found to be readily possible to strap the transducer assembly 10 properly in place and adjust the pressure on the force sensing head 70 by means of the positioning member 50 and the compression spring 84 to obtain and record a satisfactory phasic configuration of blood pressure.

DESCRIPTION OF THE EMBODIMENT OF FIGS. 6, 8 and 11

Referring now to FIGS. 6, 8 and 11, there is illustrated a slightly modified transducer assembly which will be generally designated by the reference character 10a. The transducer assembly 10a comprises a slightly modified transducer supporting frame 12a, a pair of electro-mechanical force sensing transducers 14, and a strap 16. The force sensing transducers 14 are identical to the force sensing transducer described in detail above and therefore will not be described again. Similarly, the strap 16 is substantially identical to the strap described above for the transducer assembly 10 and will not be described in detail again.

The transducer supporting frame 12a differs from the transducer supporting frame 12, described above, in that a second aperture 24 is formed therein to receive the additional force sensing transducer 14 in a manner identical to that described above for the transducer assembly 10. It is readily apparent that force sensing transducers 14 in the transducer assembly 10a are preferably positioned in substantial alignment with the strap 16 which is secured to the transducer supporting frame 12a. While this arrangement is deemed preferable, it should be noted that other arrangements of the force sensing transducers 14 relative to the strap 16 may be desirable in certain applications.

OPERATION OF THE EMBODIMENT OF FIGS. 6, 8 and 11

Figure 13:
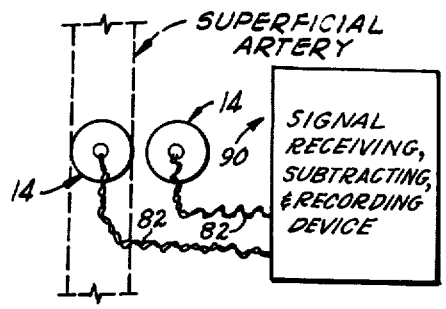
FIG. 13 is a schematic diagram of the transducer assembly of FIG. 6 in relation to a superficial artery.

The operation of the transducer assembly 10a is substantially identical to that described in detail above for the transducer assembly 10. As noted above, the transducer assembly 10a, includes two force sensing transducers 14. The transducer assembly 10 is positioned on the patient with one of the force sensing transducers 14 positioned directly over the superficial artery while the second force sensing transducer is positioned several millimeters away from the artery as shown in FIGS. 8 and 13. Each of the force sensing transducers 14 is connected to a suitable receiving and recording device 90. The positioning and calibration of the force sensing transducer 14 positioned over the artery is identical to that described above for the transducer assembly 10. The force sensing transducer 14 positioned off the artery is calibrated to provide a direct current reference signal relating only to the pressure with which the transducer is applied to the patient and the adjusted pressure between the force sensing head 70 and the skin surface.

It will be readily apparent that the force sensing transducer 14 mounted off the superficial artery does not respond to arterial pressure due to its location remote therefrom. The signal from the transducer 14 that overlies the artery reflects both a direct current signal due to the pressure of the force sensing transducer 14 on the skin surface over the artery and the individually adjusted pressure of the force sensing head 70 over the artery, as well as an alternating current component which reflects the intra-arterial pressure. The electrical signal from the transducer 14 positioned off the artery is electronically subtracted from the signal produced by the transducer positioned over the artery by suitable electronic means preferably located at the receiving and recording device 90. The resultant output signal is an alternating signal proportional to the intra-arterial blood pressure.

In the event the patient moves and causes an increase or decrease of the force between them the transducer assembly 10a and the skin, such increase or decrease in pressure would cause approximately the same direct current output variation in each force sensing transducer 14. Thus, if the change in signal strength due to motion of the overlying skin in both force sensing transducers 14 is $\Delta e$, then the output signal from the off-artery transducer is $(e_{dc}+\Delta e)$, and the output signal from the on-artery transducer is $(e_{ac}+e_{dc}+\Delta e)$, where $e_{dc}$ is the direct current signal and $e_{ac}$ is the alternating current component described above. When the signal from the off-artery transducer is subtracted from the signal produced by the on-artery transducer, the result is $(e_{ac}+e_{dc}+\Delta e) - (e_{dc}+\Delta e) = e_{ac}$. Thus, the resultant signal is entirely representative of the intra-arterial pressure.

Based on the above, it is readily apparent that pressure related to changes in the firmness of application of the transducer assembly 10a is substracted. Consequently, there is no change in the output signal due to transient variations of the force of application of the transducer assembly 10a to the skin surface of a patient.

This two transducer technique has the additional advantage of enabling one to calibrate intra-arterial pressure directly. That is, the scale deflection on the receiving and recording device 90 would represent only the intra-arterial pressure. Pressure due to application and consequent compression of the skin overlying the artery would be substracted. Therefore, electrical output of the transducer assembly 10a would directly represent the intra-arterial pressure. With the previously described single transducer technique, the scale deflection represents both intra-arterial pressure and skin compression pressure. The calibration in the single transducer technique is therefore empirical.

Figure 12:
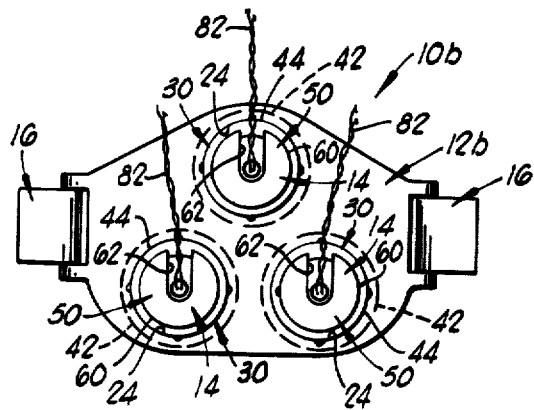
FIG. 12 is a top view of the transducer assembly of FIG. 7.

DESCRIPTION OF THE EMBODIMENT OF FIGS. 7, 9 and 12

Referring now to FIGS. 7, 9 and 12 there is illustrated therein a slightly modified transducer assembly which will be generally designated by the reference character 10b. The transducer assembly 10b comprises a slightly modified transducer supporting frame 12b, three force sensing transducers 14, and a strap 16. The force sensing tranducers 14 are substantially identical to those described in detail above for the transducer assembly 10 and, therefore, will not be described in detail again. The strap 16 is substantially identical to the strap 16 described in detail above for the transducer assembly 10 and is secured to the slightly modified transducer supporting frame 12b in an identical manner. Strap 16 will, therefore, not be described in detail again.

The slightly modified transducer supporting frame 12b differs from the transducer supporting frame 12a, described above, in that it includes a third aperture 24 formed therein. The third aperture 24 allows the positioning of the three force sensing transducers 14 in the transducer supporting frame 12b in a preferred equilateral triangular relationship as illustrated most clearly in FIG. 12. While this equilateral triangular relationship between the force sensing tranducers 17 is considered preferable, it will be understood that other positioning arrangements of the force sensing transducer 14 may be found advisable in certain applications.

OPERATION OF THE EMBODIMENT OF FIGS. 7, 9 AND 12

Figure 14:
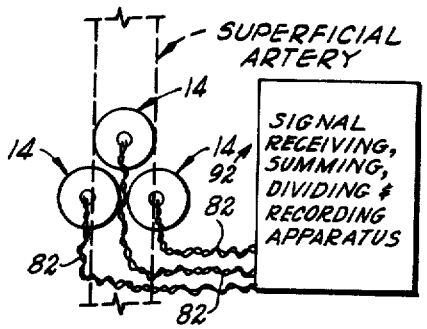
FIG. 14 is a schematic diagram of the transducer assembly of FIG. 7 in normal alignment with a superficial artery.

In operation the transducer assembly 10b is secured to the patient in a manner substantially identical to that described above for the transducer assembly 10. Transducer assembly 10b includes, as noted above, three force sensing transducers 14 disposed equidistant from each other in a substantially equilateral triangle. When properly positioned, the force sensing transducers 14 are positioned as shown in FIGS. 9 and 14 with one of the force sensing transducers 14 positioned directly over the superficial artery. The remaining two force sensing transducers 14 are positioned over the opposite edge portions of the superficial artery, as shown in FIG. 14, with preferably the same amount of superficial artery disposed beneath each of the remaining force sensing transducers. 14.

Figure 15:
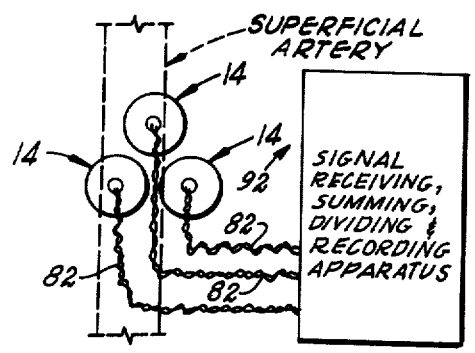
FIG. 15 is a schematic diagram of the transducer assembly of FIG. 7 in shifted alignment with a superficial artery.

The force sensing transducers 14 are applied with the proper amount of pressure to prevent occlusion of the superficial artery and are individually calibrated by means of the adjustment of the positioning member 50 to adjust the individual pressure of each force sensing head 70 on the surface of the skin. Each of the force sensing transducers 14 is electrically connected to the receiving and recording apparatus 92 remote therefrom. The receiving and recording apparatus 92 includes means which are adapted to sum the three pressure signals received from each force sensing transducer 14 and to divide the sum of the three signals by three to determine the actual output therefrom indicative of intra-arterial pressure. The advantage of the particular configuration evident in the transducer assembly 10b is the provision for the automatic correction of intra-arterial pressure indication due to lateral shift of the force sensing tranducers 14 caused by motion of the patient or motion of the skin underlying the transducers 14. It will be readily apparent that as one of the force sensing transducers 14 shows an increased signal as it approaches the midline of the superficial artery, as shown in FIG. 15, the remaining force sensing transducers 14 show a proportionally smaller signal. Consequently, the net output of all three force sensing transducers 14 will not vary with slight displacement of the transducers assembly 10b relative to the superficial artery.

DESCRIPTION OF THE EMBODIMENT OF FIG. 16

Figure 16:
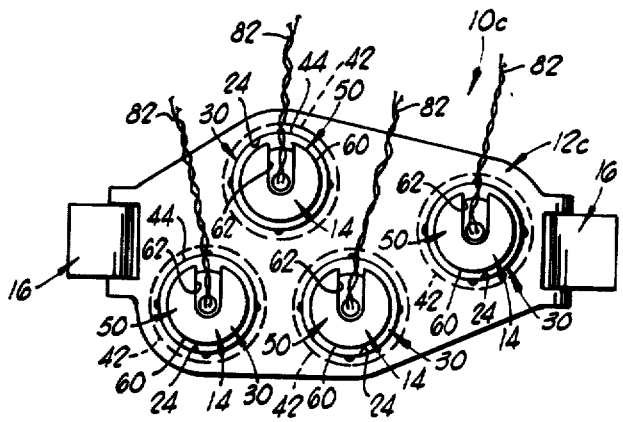
FIG. 16 is a top view of another form of transducer assembly.

FIG. 16 illustrates another slightly modified transducer assembly which will be generally designated by the reference character 10c. The transducer assembly 10c comprises a slightly modified transducer supporting frame 12c, four force sensing transducers 14, and a strap 16. The force sensing transducers 14 are substantially identical to those described in detail above for the transducer assembly 10 and, therefore, will not be discussed in detail again. The strap 16 is substantially identical to the strap 16 described in detail above for the transducer assembly 10 and is secured to slightly modified transducer supporting frame 12c in an identical manner. The strap 16 will not be described in detail again.

The slightly modified transducer supporting frame 12c differs from the transducer supporting frame 12b, described above, in that it includes a fourth aperture 24 formed therein. The fourth aperture 24 allows the positioning of one additional force sensing transducer 14 in the transducer supporting frame 12c a small distance from the other three force sensing transducers 14 which are arranged in an equilateral triangular retationship as described above for the transducer assembly 10b.

OPERATION OF THE EMBODIMENT OF FIG. 16

Figure 17:
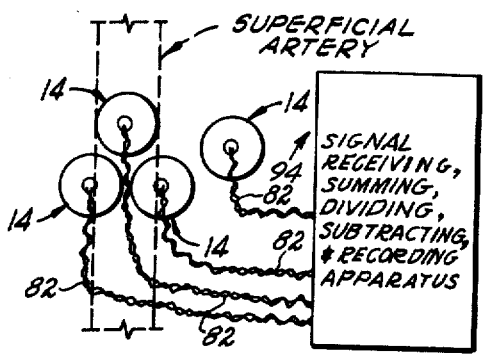
FIG. 17 is a schematic diagram of the transducer assembly of FIG. 16 in relation to a superficial artery.

In operation the transducer assembly 10c is secured to the patient in a manner substantially identical to that described above for the transducer assembly 10. The transducer assembly 10c includes, as noted above, three force sensing transducers 14 disposed equidistant from each other in a substantially equilateral triangle. When properly positioned, these three force sensing transducers 14 are positioned as illustrated in FIG. 17 with one of the force sensing transducers 14 positioned directly over the superficial artery. The remaining two force sensing transducers 14 are positioned over the opposite edge portions of the superficial artery with preferably the same amount of superficial artery disposed beneath each of these two force sensing transducers 14.

The fourth force sensing transducer 14 is positioned several millimeters away from the artery, in a manner similar to that described above for the transducer assembly 10a.

The transducer assembly 10c is applied to the patient and secured by the strap 16 with the proper amount of pressure to prevent occlusion of the superficial artery, and the four force sensing transducers 14 are individually calibrated by means of the adjustment of the respective positioning members 50 to adjust the individual pressure of each force sensing head 70 on the surface of the skin. Each of the force sensing transducers 14 is electrically connected to the receiving and recording apparatus 94 remote therefrom. The receiving and recording apparatus 94 includes means adapted to continuously sum the three pressure signals received from each of the three triangularly arranged force sensing transducers 14 and to continuously divide the sum of the three signals by three to determine the actual output therefrom indicative of intra-arterial pressure. The advantage of the configuration of these three transducers 14 in the transducer assembly 10c is described in detail above for the transducer assembly 10b.

The output from the fourth force sensing transducer 14, mounted off the superficial artery, is also received by the receiving and recording apparatus 94. The receiving and recording apparatus 94 includes means for continuously electronically subtracting the signal received from the off-artery transducer 14 from the summed and divided signals received from the other three force sensing transducers 14. This operation is similar to that described above for the transducer assembly 10a. The resultant output signal is an alternating signal proportional to the intra-arterial blood pressure.

The transducer assembly 10c provides the calibration advantages of the transducer assembly 10a and the self-correcting advantages of the transducer assembly 10b.

It is believed apparent that the various embodiments of the present invention readily obtain the objectives set forth herein. Changes may be made in the arrangement or combination of parts or elements shown in the drawings and described in the specification without departing from the spirit and scope of the invention as defined in the following claims.

What is claimed is:

1. A non-invasive method of providing a continuous direct indication of the arterial blood pressure of a patient at a continuously unoccluded superficial artery without the necessity of detecting Korotkov sounds, comprising the steps of:
    positioning a first force sensing transducer on the skin surface of the patient directly over and not occluding the continuously unoccluded superficial artery;
    positioning a second force sensing transducer on the skin surface of the patient alongside, but not over, the superficial artery;
    directly sensing, with the first force sensing transducer, physical arterial geometric distorions of the superficial artery indicative of blood pressure variations within the superficial artery in addition to force components not originating as a result of arterial blood pressure variations;
    directly sensing, with the second force sensing transducer, said force components not originating as a result of said arterial blood pressure variations;
    sending a continuous first signal from the first force sensing transducer, with the first force signal including a component indicative of the pressure of blood in the superficial artery and a component representing said force components not orginating as a result of said arterial blood pressure variations;
    sending a continuous second signal from the second force sensing transducer, the second signal including a component indicative of said force components not originating as a result of said arterial blood pressure variations;
    receiving the continuous first signal from the first force sensing transducer;
    receiving the continuous second signal from the second force sensing transducer;
    continuously subtracting the second signal from the first signal thereby cancelling the components indicative of force components not originating as a result of said arterial blood pressure variations; and
    utilizing the remaining component indicative of the pressure of blood in the artery obtained from continuously subtracting the second signal from the first signal to provide a continuous indication of arterial blood pressure.

2. A method of continuously monitoring the arterial blood pressure of a patient comprising the steps of:
    positioning a first force sensing transducer on the skin surface of the patient directly over a superficial artery;
    positioning a second force sensing transducer on the skin surface of the patient over one edge portion of a superficial artery;
    positioning a third force sensing transducer on the skin surface of the patient over the opposite edge portion of the superficial artery;
    receiving a continuous first signal from the first force sensing transducer;
    receiving a continuous second signal from the second force sensing transducer;
    receiving a continuous third signal from the third force sensing transducer;
    continuously summing the first, second and third signals;
    continuously dividing the sum of the first, second and third signals by three and;
    utilizing the results obtained from continuously dividing the sum of the first, second and third signals by three to provide an indication of arterial blood pressure.

3. The method of continuously monitoring the arterial blood pressure of a patient as defined in the claim 2 characterized further to include the additional steps of:
    positioning a fourth force sensing transducer on the skin surface of the patient a small distance from the superficial artery;
    receiving a continuous fourth signal from the fourth force sensing transducer;
    continuously subtracting the fourth signal from the resulting signal obtained by continuously dividing the sum of the first, second and third signals by three; and
    utilizing the results of continuously subtracting the fourth signal from the resulting signal obtained by continuously dividing the sum of the first, second and third signals by three to provide indication of arterial blood pressure.

* * * * *